United States Patent
Suumäki et al.

(10) Patent No.: US 6,590,905 B1
(45) Date of Patent: Jul. 8, 2003

(54) CHANGING XID/PDCP PARAMETERS DURING CONNECTION

(75) Inventors: Jan Suumäki, Tampere (FI); Juha Kalliokulju, Vesilahti (FI); Matti Turunen, Tampere (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/470,490

(22) Filed: Dec. 22, 1999

(51) Int. Cl.$^7$ .............................. H04J 3/16; H04J 3/22
(52) U.S. Cl. ..................................... 370/466; 370/468
(58) Field of Search .................. 370/328, 338, 370/401, 466, 475, 468

(56) References Cited

U.S. PATENT DOCUMENTS

| | | | | |
|---|---|---|---|---|
| 5,339,316 A | * | 8/1994 | Diepstarten | 370/85.13 |
| 5,551,068 A | * | 8/1996 | Goldsmith et al. | 455/89 |
| 5,748,915 A | * | 5/1998 | Iijima | 395/285 |
| 5,805,705 A | | 9/1998 | Gray et al. | 380/48 |
| 5,818,871 A | | 10/1998 | Blakeney et al. | 375/220 |
| 6,118,775 A | * | 9/2000 | Kari et al. | 370/349 |
| 6,125,122 A | * | 9/2000 | Favichia et al. | 370/466 |

FOREIGN PATENT DOCUMENTS

| EP | 0 827 312 | * | 7/1997 | H04L/29/06 |
|---|---|---|---|---|
| EP | 0827312 | | 3/1998 | |

OTHER PUBLICATIONS

3G TS 23.121 v3.2.0 (Jan. 2000), 3GPP; Technical Specification Group Services and Systems Aspects; Architectural Requirements for release 1999.

3G TS 25.322 v3.1.2 (Jan. 2000), 3GPP; Technical Specification Group Radio Access Network; RLC Protocol Specification.

* cited by examiner

*Primary Examiner*—Thanh Cong Le
*Assistant Examiner*—Tuan Tran
(74) *Attorney, Agent, or Firm*—Ware, Fressola, Van Der Sluys & Adolphson

(57) ABSTRACT

An implementation of packet data control protocol (PDCP) parameter negotiation in a universal mobile telephone communications service (UMTS) which can also be used to improve GSM/GPRS XID negotiation methods, where the timing for exactly when the new parameters are to take effect must be known includes either a GPRS-type reset solution or a PDCP-header based change indicator solution. In the GPRS-type reset solution, PDCP negotiations are made and then connections are reset to put into effect the new PDCP parameters for use. The second solution is to add a change indicator, e.g., a bit (C-bit) to the PDCP-PDU's header part. The originator informs using this bit that new parameter values are to take effect for use.

18 Claims, 12 Drawing Sheets

FIG. 6

| Bit   | 8 | 7 | 6 | 5 | 4 | 3 | 2 | 1 |
|-------|---|---|---|---|---|---|---|---|
| Oct 1 | PDU type ||| PID |||||
| ---   | Data segment |||||||||
| N     |  |||||||||

FIG. 7

| Bit   | 8 | 7 | 6 | 5 | 4 | 3 | 2 | 1 |
|-------|---|---|---|---|---|---|---|---|
| Oct 1 | PDU type ||| C | PID ||||
| ---   | Data segment |||||||||
| N     |  |||||||||

ORIGINATOR,
Reliable negotiation

Receiver, Reliable negotiation

CHANGING XID/PDCP PARAMETERS DURING CONNECTION

FIELD OF THE INVENTION

The invention is related to packet traffic in both the General Packet Radio Service (GPRS) and the proposed Universal Mobile Telecommunications System (UMTS) for mobile telecommunication and, more particularly, to changing parameters during a connection.

BACKGROUND OF THE INVENTION

The proposed Universal Mobile Telecommunications System (UMTS) of FIG. 1A has a packet data protocol stack in the user plane, as shown in FIG. 1B that has some differences as compared to the prior General Packet Radio Service (GPRS) of FIGS. 2A and 2B, partly due to a new radio interface technology and partly due to much higher quality of service (QoS) requirements. In both systems, there is a need to negotiate certain parameters during setup, including compression algorithms. In GPRS the negotiated parameters are called exchange identification (XID), while in UMTS the negotiated parameters are called Packet Data Control Protocol (PDCP) parameters, which are more or less the same kind of parameters.

In the General Packet Radio Service (GPRS) of FIG. 2A, XID parameters are used in the Logical Link Control (LLC) and Subnetwork Dependent Convergence Protocol (SNDCP) layers of FIG. 2B. These protocols are located in the mobile station (MS) and in the Serving GPRS Support Node (SGSN), as shown in FIG. 2B. An example situation where there might be a need for renegotiation in GPRS is handover. New network elements don't necessarily have the same features as the old one(s), so there might be a need to renegotiate XID parameters.

In the UMTS of FIGS. 1A and 1B, the Packet Data Convergence Protocol (PDCP) (the old name shown in FIG. 1B is L3CE) corresponds to the SNDCP protocol of FIG. 2B (there is no protocol in UMTS that is similar to LLC). PDCP is located in the MS and the Radio Network Controller (RNC) of the Radio Access Network (RAN) of FIGS. 1A and 1B.

Typical XID/PDCP parameters are header compression methods, protocol version, etc. The negotiation is normally a two-way negotiation. First the initiator (in GPRS the initiator can be either the MS or network side element) requests XID/PDCP parameters which are suitable for it. Parameters are transferred to the peer entity, which selects suitable (parameters that it can support) XID/PDCP parameters and negotiates values within certain rules. Those negotiated XID/PDCP parameters are returned back to the initiator.

The main problem is that both ends have to know exactly when the new values have taken effect, i.e., when to start using the new XID/PDCP parameters. Some parameters don't cause a problem but, e.g., in compression algorithms, the receiver must know exactly when a new compression algorithm is used.

In UMTS as compared to GPRS, there are major differences related to handovers and protocol architecture. These changes reflect on PDCP negotiation. The main requirement still exists in UMTS, i.e., both ends have to know exactly when new PDCP parameters are to take effect for use. Architectural changes are the removing of the LLC layer and the new location of PDCP (corresponding to SNDCP layer), which is RNC.

There is a situation in UMTS called Serving Radio Network Subsystem (SRNS) relocation, i.e., inter Radio Network Controller (RNC) handover. Such would be, for instance, a change from one of the RNCs shown in FIG. 1A to the other. Execution of that handover is not allowed to disturb or suspend the user data transmission. The factors which ensure the reliability of transmission with high confidence have to be maximized. There should be means to renegotiate the PDCP parameters for such a relocation.

It would also be advantageous for such means to be able to be used any time, not necessarily during a handover or relocation, for both GPRS and UMTS applications, without requiring any reset type procedure.

SUMMARY OF INVENTION

The first solution according to the present invention is similar to GPRS.

In GPRS, this is handled by resetting the whole connection. So XID negotiation is made firstly and then connections are reset (LLC layer connections are re-established). After reset, the new XID parameters are taken up for use. Typically in GPRS, renegotiation is made during handover (inter SGSN handover). So XID negotiation is made during handover procedures, and after handover (LLC layer) connections are reset. When the handover procedure is finished, data transfer starts with renegotiated XID parameters. Data transmission is suspended the whole time of the handover procedure.

In UMTS, there is no LLC layer, but the Radio Link Control (RLC) layer can be used instead. By resetting RLC connections the same function can be achieved. So, according to a first aspect of the invention, PDCP negotiation is made, and then connections are reset to put into effect the new PDCP parameters for use. (Note: The RLC layer already has Reset-PDUs (Packet Data Units), which can be used to reset RLC links.) If during the SRNS relocation procedure the RLC links are reset, the reset can be used also for PDCP negotiation purposes.

There are dynamically created protocol entities in UMTS at the RLC and PDCP layers which have responsibility for functions of the layer. The location of these layers are in the RNC and in the User Equipment (UE), such as an MS. Those layer entities get initial values by help of which their actual functionality can be started. In cases where the SRNC is changed and a new SRNC is started up, i.e., the RLC and PDCP layers are relocated due to handover, it is therefore feasible to reset these protocol entities of the layers. This is done instead of copying the detailed entity information, i.e., state machines to the new SRNC. The reason for this is reduction of the complexity and to incrementally increase reliability. Thus the only information which is copied and has to be transferred between source and target SRNCs are the data packet buffers of the source SRNC. This speeds up the handover process which is an important feature especially for RT applications.

In conclusion, the reset procedure is used in GPRS and also in UMTS during handover, according to the first solution of the invention. However, if negotiation is needed to be made during a normal connection (not handover), the reset procedure is not very feasible. E.g., some packets have to be retransmitted and the reset causes some delay.

So, if the RLC links are not to be reset, the following second solution can be used during normal data transmission. The second solution for the problem, according to the invention, is to add a change indicator such as a bit (C-bit) or equivalent to the PDCP-PDU's header part. The sender informs on this bit that new parameter values are to take effect for use.

It should be noted that the change indicator may be used in other applications where there is need to change parameters during connection with the following underlying requirements (not necessarily only for PDCP/XID negotiation):

both ends must know exactly when the new values of the parameters are to take effect for use; and new values cannot be directly derived from the packet.

The following describes in detail only one potential application of this invention. It should be realized however that the disclosed change indicator solution is applicable to indicate any kind of change in parameters. PDCP/XID negotiation is only an example for change indicator usage.

These and other objects, features and advantages of the present invention will become more apparent in light of the following detailed description of a best mode embodiment thereof, as illustrated in the accompanying drawing.

BRIEF DESCRIPTION OF THE DRAWINGS

FIG. 6 shows a PDCP-data-PDU format for the proposed UMTS.

FIG. 7 shows how such a PDU might be changed to accommodate the change indicator of the present invention.

BEST MODE FOR CARRYING OUT THE INVENTION

Figure 1A:
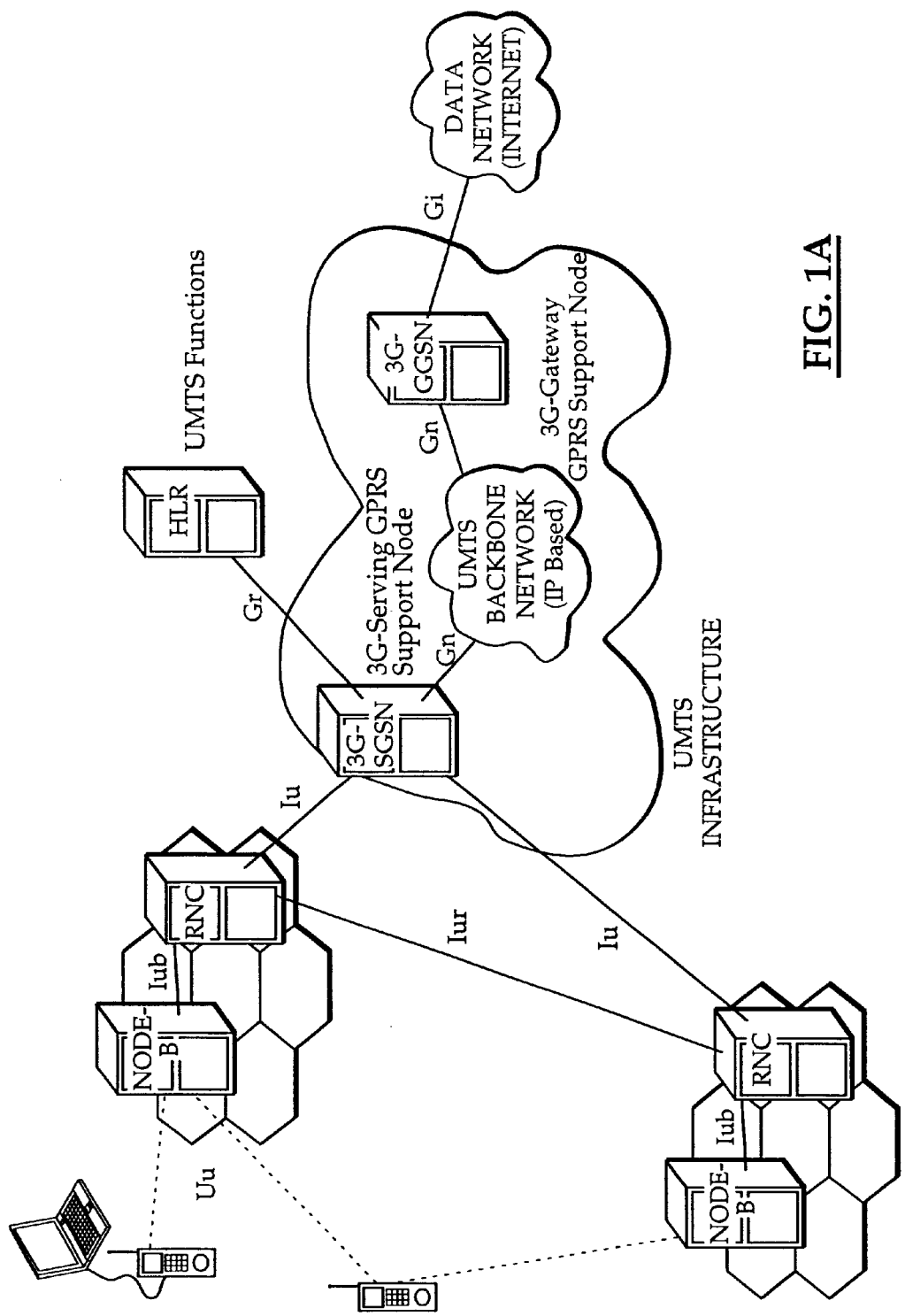
FIG. 1A shows the proposed UMTS packet network architecture.
Figure 2A:
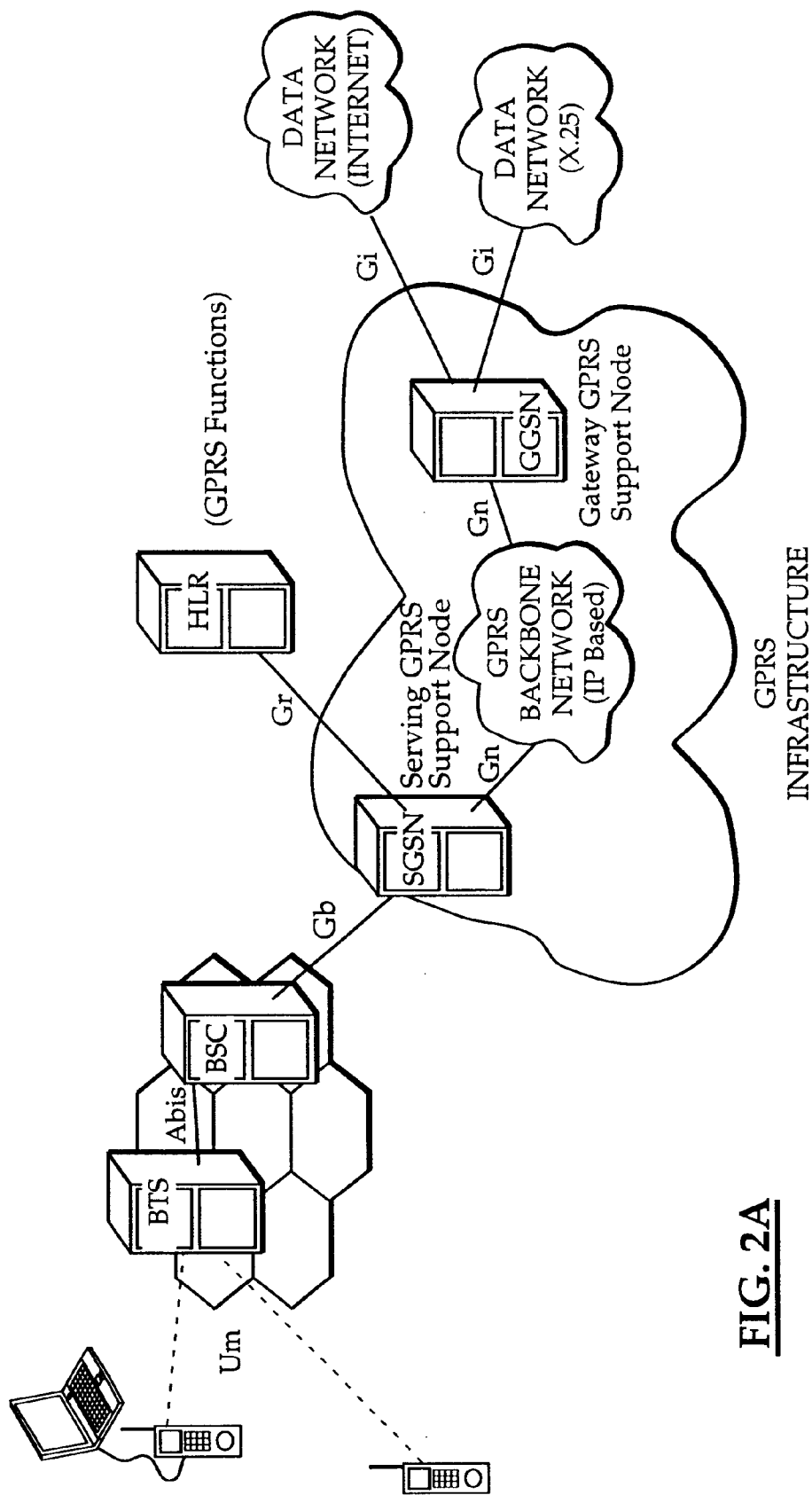
FIG. 2A shows the GPRS network architecture.
Figure 1B:
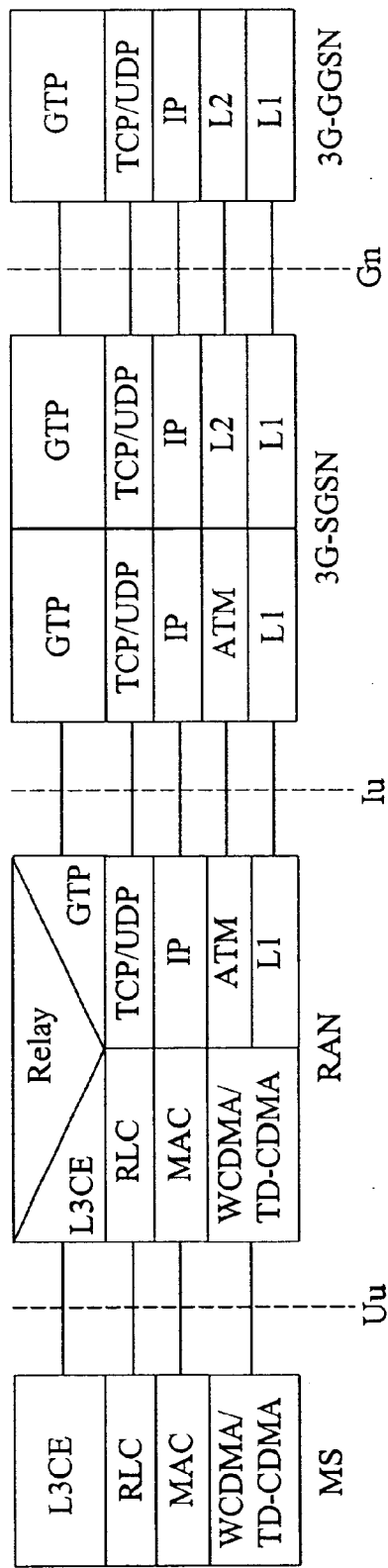
FIG. 1B shows the proposed UMTS user plane protocol stack.
Figure 2B:
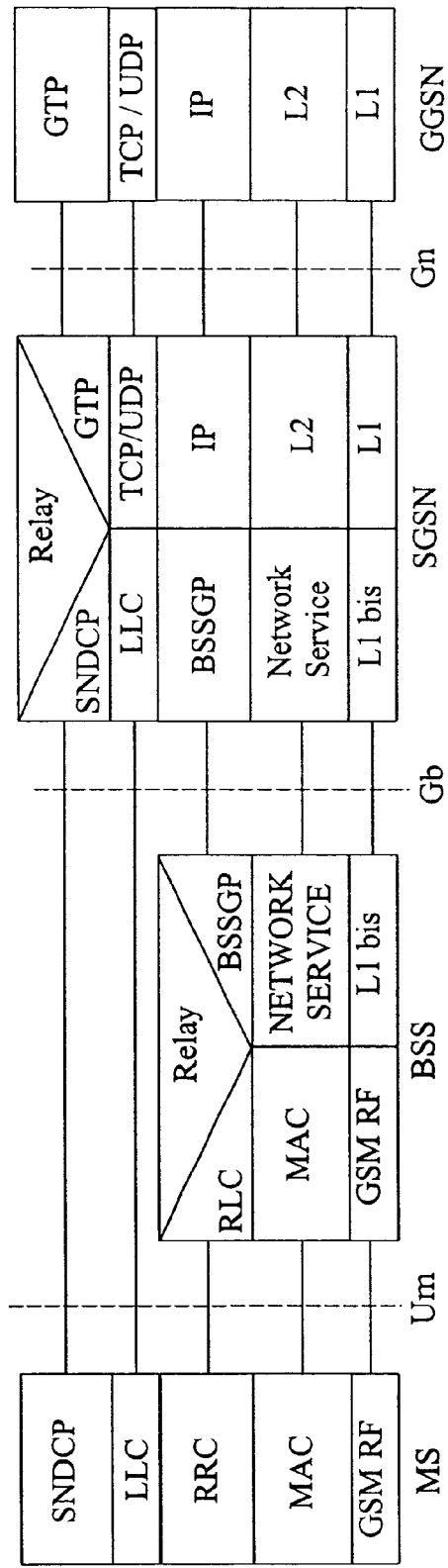
FIG. 2B shows the GPRS user plane protocol stack.
Figure 3:
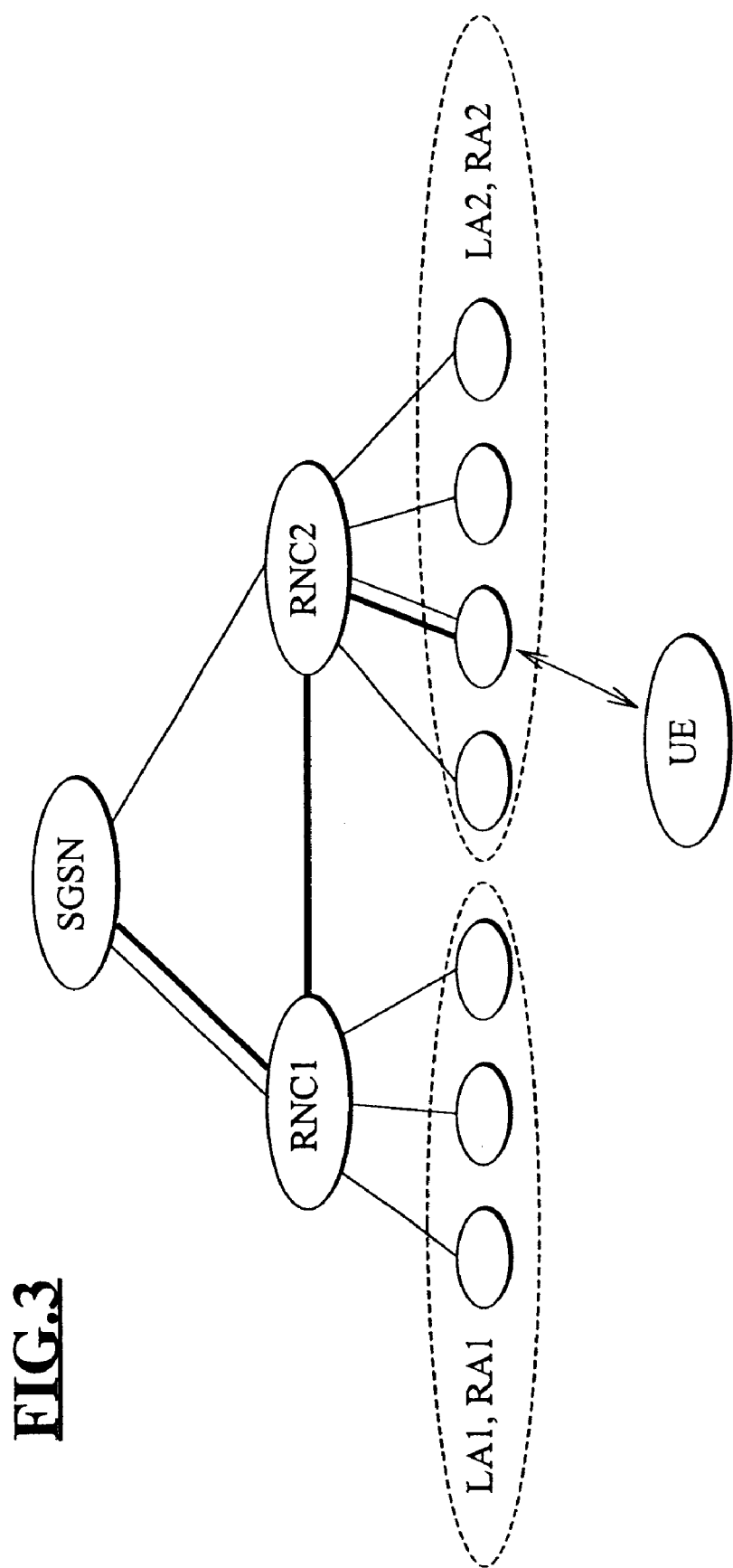
FIG. 3 shows a first part of an SRNS handover scenario, before the SRNS relocation and location registration.
Figure 4:
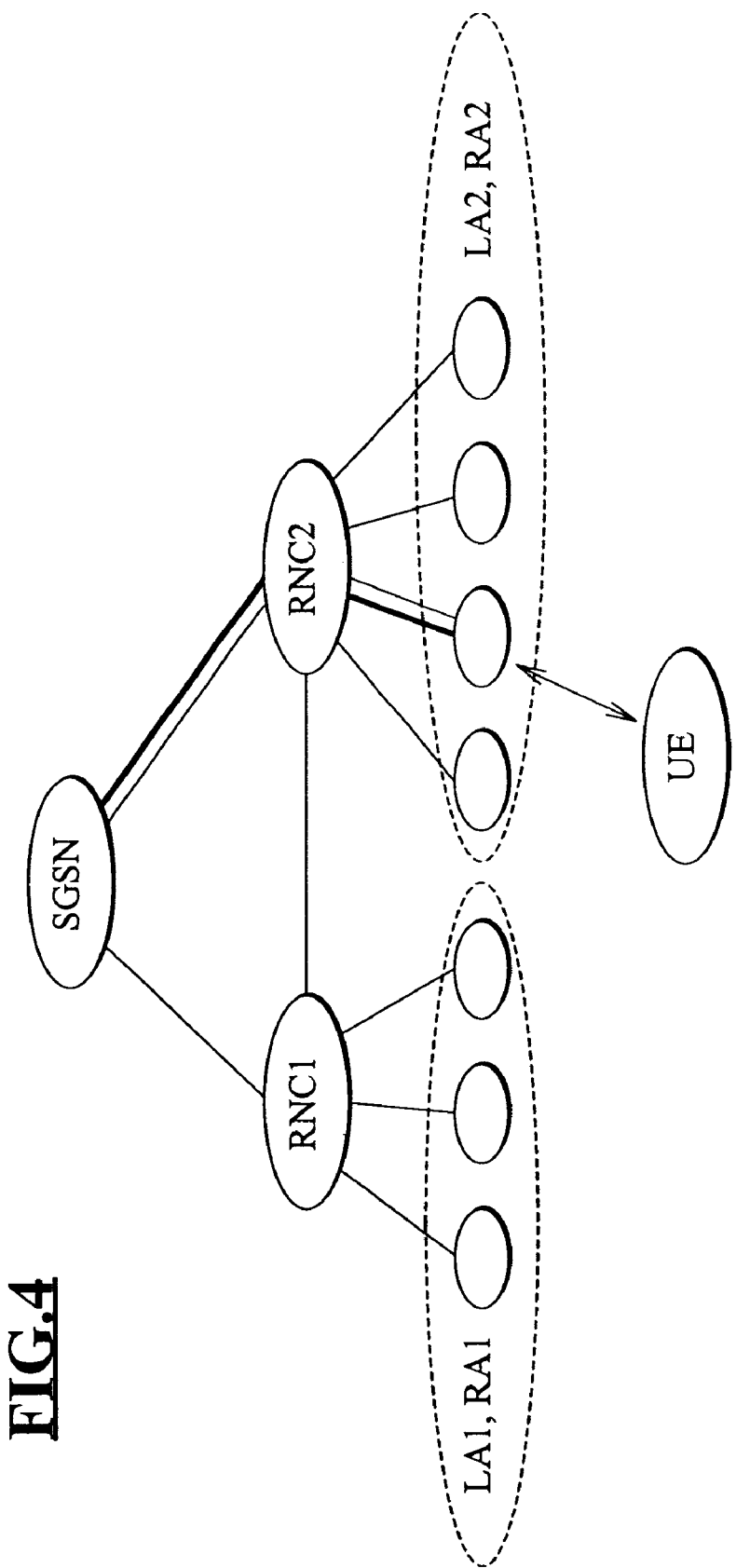
FIG. 4 shows a second part of the SRNS handover scenario after the SRNS relocation and location registration.
Figure 5:
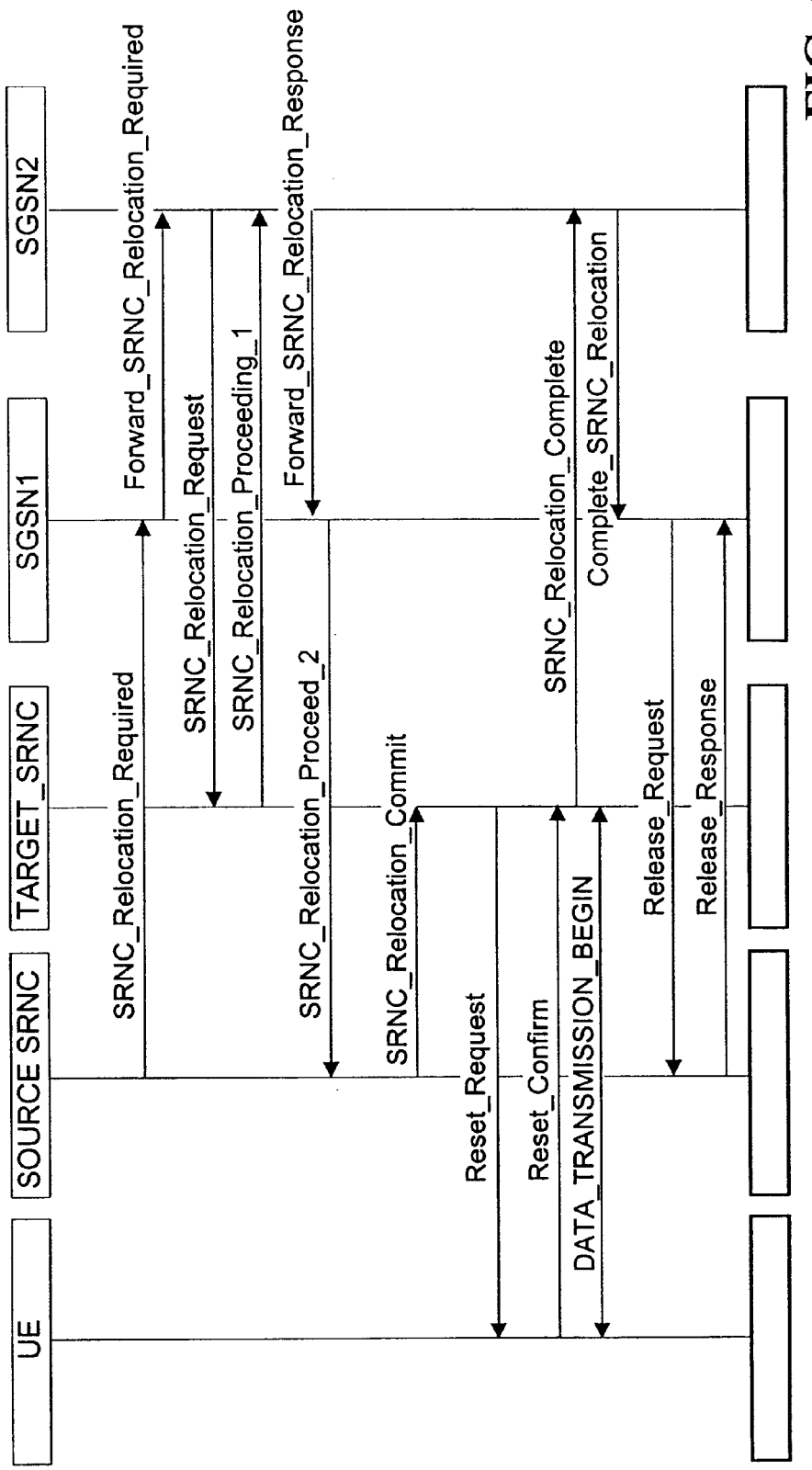
FIG. 5 illustrates a signaling sequence chart.

FIGS. 3 and 4 illustrate a UMTS scenario of Serving Radio Network Controller (SRNC) handover, before and after the SRNC relocation, respectively. FIG. 5 illustrates a related a signaling sequence.

The Serving Radio Network Subsystem (SRNS) relocation procedure (see 3GPP-TS 23.121 chapter 4.3.12.2) is used to change the RNC control point, i.e., inter RNC handover. In this procedure, the location of PDCP changes in the network side. Because different RNCs may support different XID parameters, XID (re)negotiation is usually made during SRNS relocation.

The Packet Data Control Protocol (PDCP) parameters are delivered, for example, as described in the copending patent application entitled "Transfer of PDCP Parameters During Handover of a Mobile Station Between Radio Network Subsystems", filed on Nov. 29, 1999 under U.S. Provisional Application Serial No. 60/167,924.

The reset solution of the present invention will be described first. It is the duty of the target SRNC to execute all specific PDCP parameter setup procedures, i.e., related to the header compression method, as shown in FIG. 5 before the SRNC_Relocation_Commit message is received from the source SRNC. Right after that a Reset_Request is sent to the UE which resets the PDCP entity and optionally the RLC entity of the UE. The RLC entity reset is possible but not necessary. RLC reset procedure can be potentially used by sending a RESET PDU (described in 3G TS 25.322) but this can be implemented also another way. The most essential part of the PDCP reset is reset of the header compressor/decompressor after which the first packets are transmitted/received with full headers. Successful resets are indicated, as in FIG. 5, with Reset Confirm. In the target SRNC the creation of the RLC and PDCP entities corresponds to a reset. The creation is executed before the Reset_Request is sent to the UE. The relocation is completed after the resets and the corresponding primitives are conveyed to the correct elements. At the same time the data transfer can be started. It has to be ascertained that the first headers are not compressed. This means that the reset compressor sends packets with full headers. The exact number of uncompressed packets is not tied to a certain value but it must be great enough to become convinced that packets are really getting across to the destination and no synchronization loss occurs. When this is clear, the header compression can be started.

It is an objective for the UMTS that it should be designed for future demands and be a generic platform for different kinds of methods. The reset in handover will result in such suitable circumstances and ensure the reliability for using different compression algorithms.

Without reset the protocol entity's state machine including, e.g., internal timers and counters have to be copied exactly "as is" in the source SRNC at the very moment when the handover occurs. This would increase much of complexity to UMTS which should be avoided as far as possible. The information from the source RNC to the target RNC has to be conveyed via at least two Iu interfaces and furthermore possibly via the interface between two SGSNs. This will increase overall delay which might cause unpredictable problems especially with real time applications. Furthermore the transmission can be unreliable over any link and so in this case the probability of a copy failure grows.

From the header compression point of view the reset brings also more reliability. That is because there have been developed header compression methods which are based on differential coding. This means that a compressed header can be decompressed only by knowing exactly the structure of the previously sent header. So there is an absolute correlation between sequential packets. If the header compression continued at the same state in the target RNS in a handover case it would require an exact copy of the compressor or decompressor entities. This will increase unreliability and delay as was described above. In the case of the use of differential header compression algorithms, one packet loss will usually generate additional packet loss. Thus the sending of the first packet from the target RNC has to succeed to hold the compressor synchronization. In radio circumstances where the bit error ratio may alternate randomly a correct reception is not always clear. The conclusion can be made that with long periods of time in such conditions where the bit error ratio varies much the behavior is irregular. So the likelihood for successful handover would diminish if state machines are copied to the target SRNC. If the reset is instead used for the compressor or decompressor then the first packets to the target are sent without compression so the risk that loss of synchronization occurs diminishes considerably.

RLC reset in the UE is not always necessary but it is needed when there are remaining compressed headers in the RLC buffer which have been compressed with the algorithm of the source RNC and new PDCP parameters have been negotiated for a new header compression method. Then the buffered packet can't be decompressed in the decompressor of the new method.

These foregoing explanations show that there are good reasons to execute reset for RLC and PDCP entities.

The second solution according to the present invention is to use a change indicator such as a Change (C) bit as a flag to signal a desired or actual change in parameters. FIG. 6 shows the currently contemplated PDCP data PDU that is intended to be used to convey a payload unit containing a PDCP-SDU, header compression related control signaling or data that has been obtained from the PDCP-SDU after header compression. The PDCP-data-PDU parameters are defined using the PDU type bits 6–8 and the PID bits 1–5 of octet #1. The PID field value defines the header compression type used and the packet type. One compression algorithm may reserve a certain amount of values from the PID field value space for different packet types. When receiving a PDCP packet, the reverse operation is carried out in the header decompression, according to the PID field value. There is no fixed relationship between the PID field value and the used optimization/packet type, but PID field values are defined dynamically at the time of the PDCP parameter negotiation. According to one embodiment of the change indicator of the present invention, a C-bit might be added by defining a new PDU-type such as shown in FIG. 7. As can be seen, the number of bits available for the PID value has been shortened from five to four, and the extra bit has been designated for use as the C-bit. On the other hand, if the PID value is difficult to shorten, the C-bit could be added somewhere else, for instance, to octet #2. PDCP negotiation can be similar to XID negotiation in GPRS (or the actual negotiation can be carried out, e.g., via the control plane or by some other method). The inventive change indicator, e.g., in the form of a C-bit can be a 'flip-flop' type. Every time XID/PDCP parameters are renegotiated and take effect for use, the C-bit changes its state ('0'→'1' or vice versa). The C-bit remains the same until the next renegotiation. As an optional benefit, even if packets are out of sequence, the receiver can still handle a given packet correctly. When the receiver gets a packet with a changed C-bit, it "knows" that negotiation has taken place and uses the correct parameter values. But if in the next packet C-bit has changed again, the receiver knows that the packet is in the wrong order (sequence numbers not necessarily needed) and uses the old parameter values. There should of course be some fixed minimum time difference between two XID/PDCP negotiations, so that the receiver can know when parameters are actually changed or that a packet is only out of sequence.

A detailed implementation of the invention is described below in connection with FIGS. 8 and 9 for the case where unreliable XID/PDCP negotiation is used (unreliable negotiation means that retransmission of XID/PDCP messages shall be considered when using the C-bit method):

1. As shown in FIG. 8, the originator (either end; MS or network side—in UMTS: network side=RNC, in GPRS: network side=SGSN) starts XID/PDCP parameter negotiation by requesting XID/PDCP parameters, as indicated in a step 402. These XID/PDCP parameters are transferred to the peer entity. The originator starts a retransmission timer in a step 404. The timer determines the time when an XID/PDCP request is retransmitted. The originator will not start in new negotiation until a return is made after the routine of FIG. 8 concludes after step 424, for instance.
2. The peer entity, i.e., the receiver responds as shown in FIG. 9, by receiving the request, as indicated in a step 502, negotiates parameters and replies with negotiated parameters in a step 504 back to the originator. The receiver starts a negotiation timer in a step 506. The timer determines the time when a new XID/PDCP negotiation is allowed by receiver.
3. The receiver can now start to use the new parameters for incoming packets (after sending XID/PDCP reply of step 504 to the originator) that come from an upper layer, e.g., in MS from the user to the PDCP layer and in RNC from the relay layer to the PDCP. The receiver changes (flips) a C-bit of the first XID/PDCP packet, as shown in a step 508, which used the new parameters. (The C-bit remains the same in all forthcoming packets until the next XID/PDCP negotiation, as indicated in a step 510.)
4. For so long as the timer of step 404 of FIG. 8 is unexpired, as determined in a step 406, the originator checks for a response to the request for parameter negotiation in a step 408 and continues to use the old XID/PDCP parameter values for newly-received packets, as indicated in steps 410, 414 (as long as the C-bit is not flipped) until it receives an XID/PDCP negotiation response from the receiver. If it is determined in step 412 that the C-bit is flipped, the packet is discarded as per step 416. After receiving the response sent by the receiver in step 504 of FIG. 9, the originator of FIG. 8 can stop the timer (step 418), and use the new XID/PDCP parameters. The originator changes (flips) the C-bit in the first outgoing XID/PDCP packet that goes to the receiver which used the new parameters, as indicated in steps 420, 422. Similarly, incoming packets with the C-bit flipped are assumed to be using the new parameters. If the C-bit is not flipped, then they are discarded, as shown in step 424.

Figure 8:
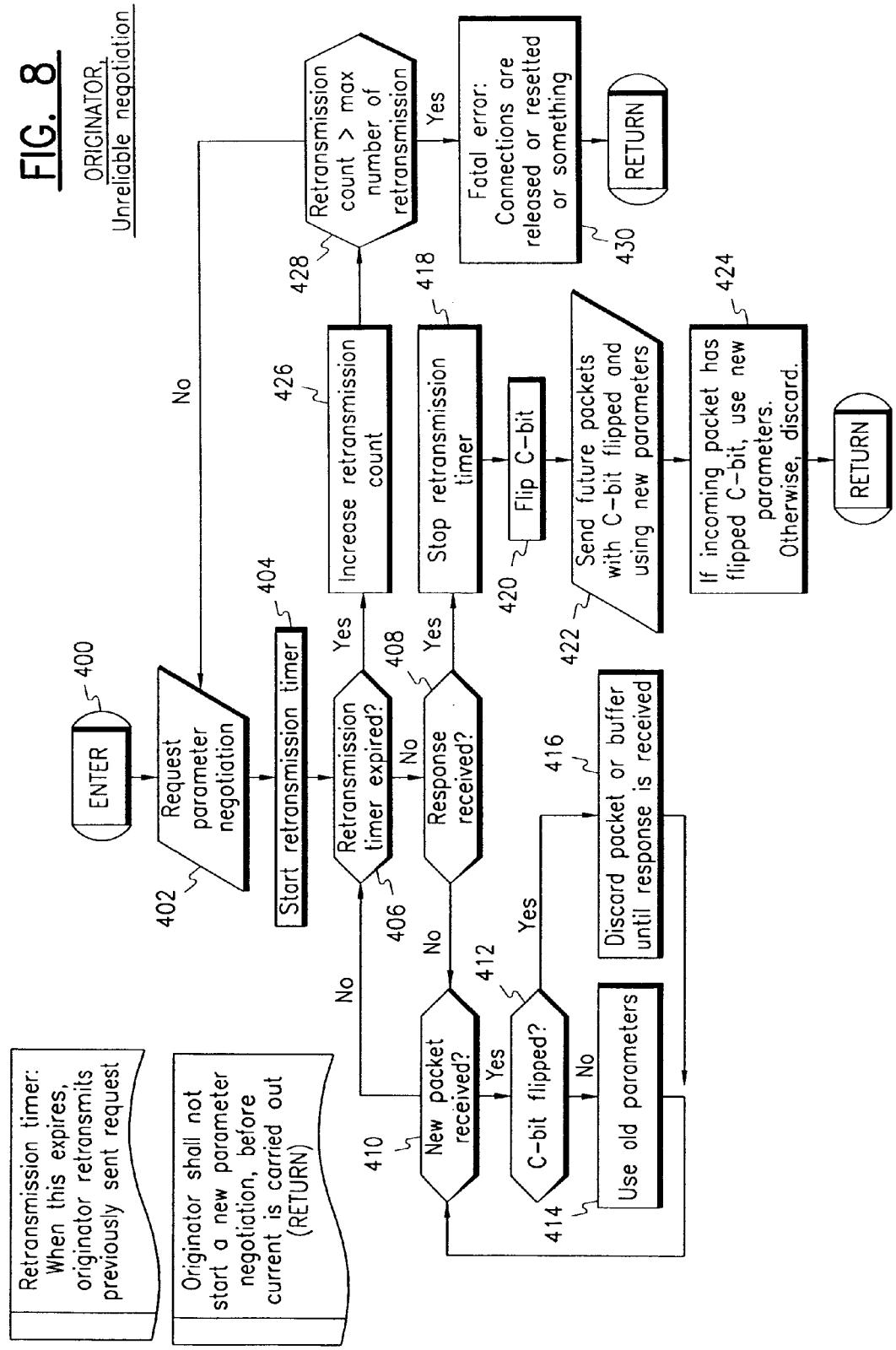
FIG. 8 shows a sequence of steps carried out by an originator for an unreliable negotiation scenario, according to the present invention.
Figure 9:
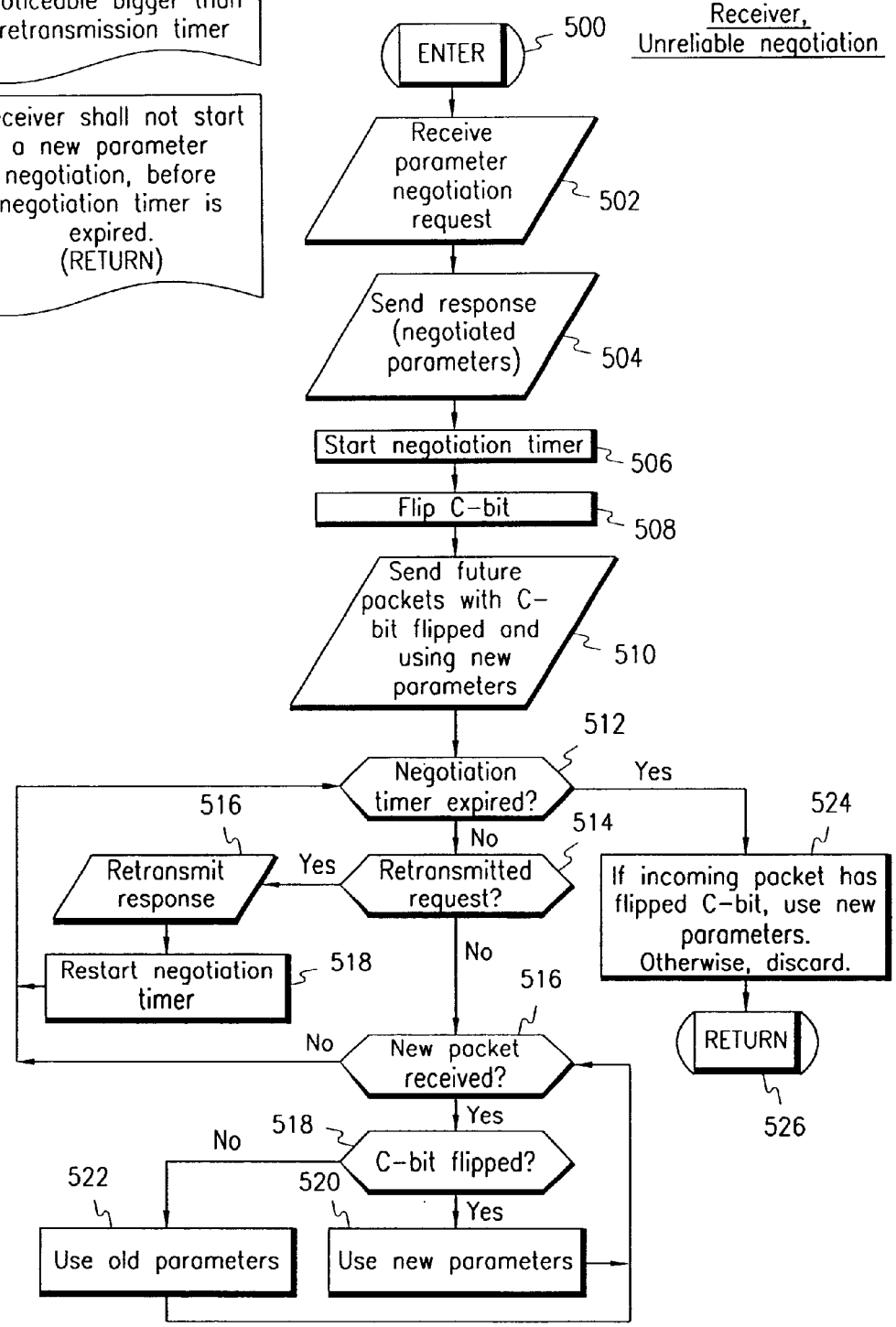
FIG. 9 shows a sequence of steps carried out by a receiver in said unreliable negotiation scenario, according to the present invention.

Exception cases with possible extensions:

If the originator receives a packet with a changed C-bit before it received the XID/PDCP reply (XID/PDCP reply may be delayed or lost), it holds or discards the packet(s) until it receives an XID/PDCP reply, as suggested in steps 408–416 of FIG. 8, for instance.

It should also be mentioned that if the retransmission timer started in step 404 is not elapsed and the originator has already received packet(s) with the changed C-bit, as indicated by a "yes" in step 412, all packets received with the "old" C-bit value are considered to be "out of sequence". This packet is either discarded, as indicated in the step 416, or if possible, handled by the old XID/PDCP parameters.

Similarly, if XID/PDCP negotiation is not done at all and the C-bit is changed, all packets received with a changed C-bit value can be considered to be invalid and thus discarded.

If XID/PDCP reply from receiver is lost, the originator may retransmit the XID/PDCP request when the retransmission timer has elapsed (this is not a new XID/PDCP negotiation). In this event, a retransmission count is increased in a step 426 and a determination is made in a step 428 if the maximum number of retransmissions has been reached or exceeded. If so, a fatal error is declared in a step 430, followed by a return. If not, the steps 402 et seq. are re-executed.

Not shown in FIG. 8 are steps that may be carried out after it is determined in the step 406 that the timer has expired. If the timer started in step 404 is elapsed and the C-bit is changed, all packets received with "old" C-bit XID/PDCP parameter values can be considered to be invalid and thus discarded. Such steps could be carried out within the routine of FIG. 8 or in another routine.

Referring back to FIG. 9, if the negotiation timer started in the step 506 has not yet expired, as determined in a step 512, a determination is made in a step 514 whether a retransmit request has been received. If so, a retransmit response is made in a step 516, and the negotiation timer is restarted in a step 518, after which the step 512 is re-executed. If it is determined in the step 514 that a retransmit request has not been received, a determination is made in a step 516 whether a new packet has been received. If not, the step 512 is executed again to find out if the negotiation timer has expired. If so, a step 518 is executed to determine if the C-bit is flipped in the newly-received packet. If so, the new parameters are used, as indicated in a step 520. If not, the old parameters are used, as indicated in a step 522, and the step 516 is again executed.

Referring back to the step 512, if it is determined that the negotiation timer has expired, it is determined in a step 524 whether any incoming packet has a flipped C-bit. If so, the new parameters are used, and otherwise it is discarded. A return is then made in a step 526.

Figure 10:
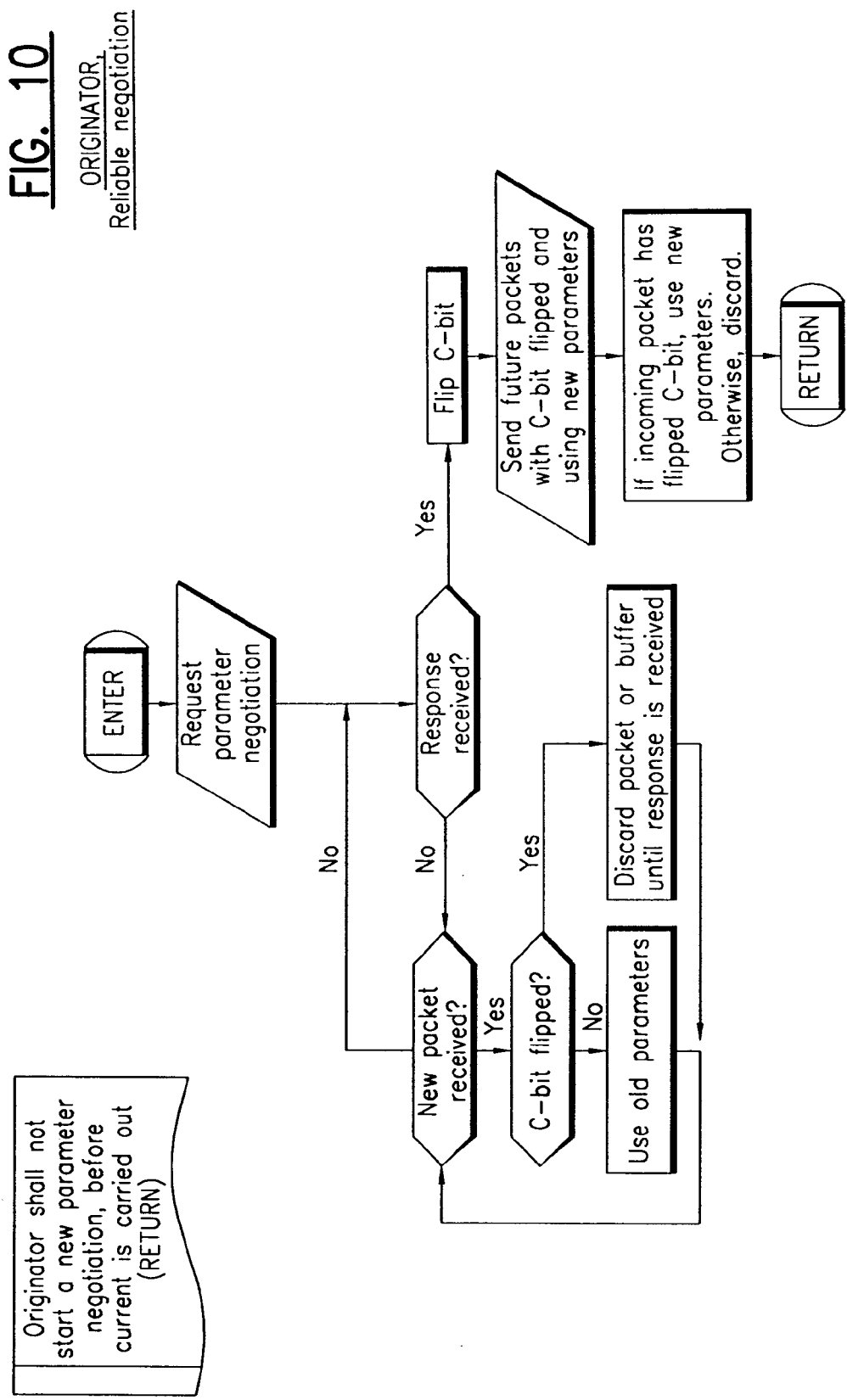
FIG. 10 shows a sequence of steps carried out by an originator for a reliable negotiation scenario, according to the present invention.
Figure 11:
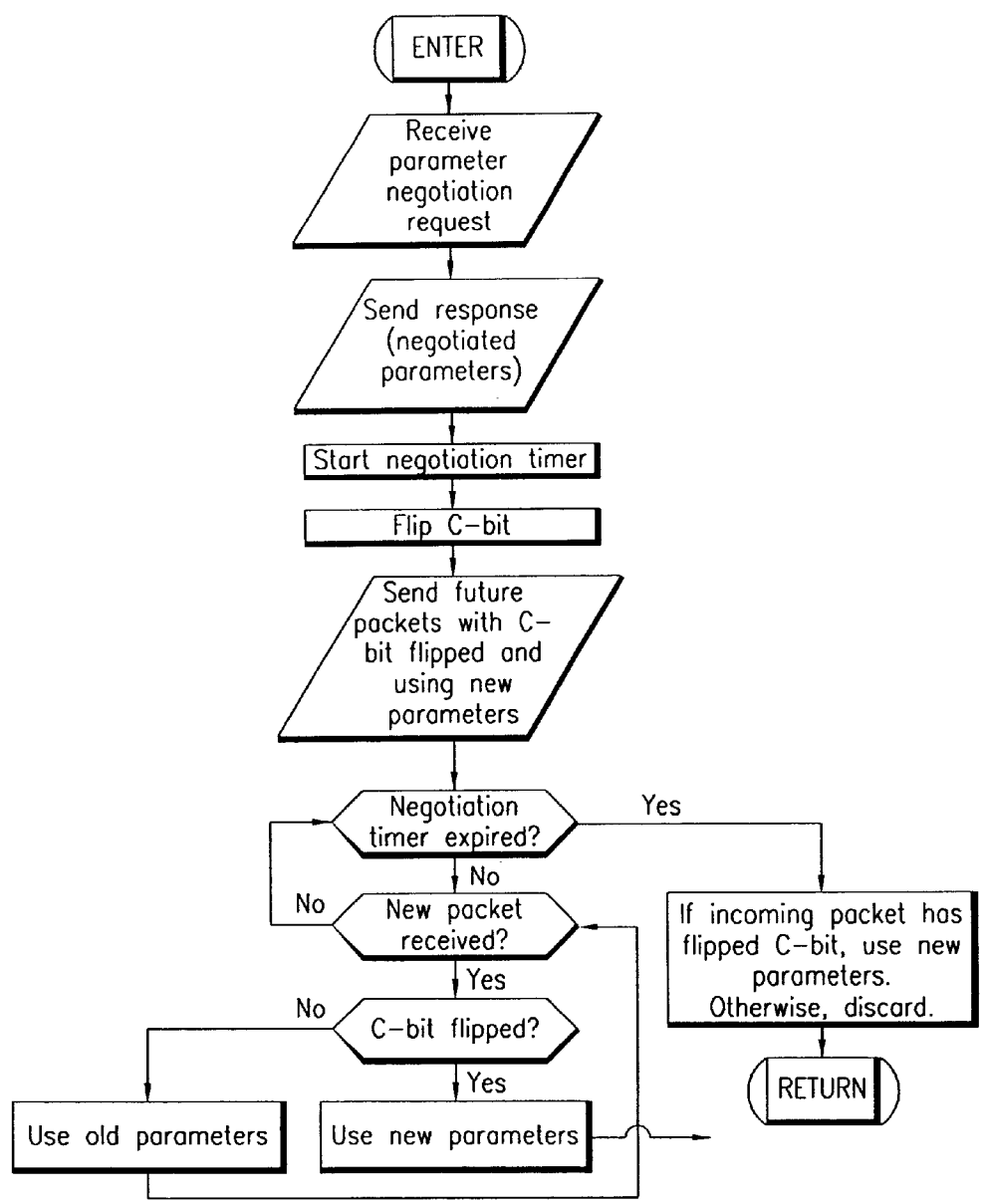
FIG. 11 shows a sequence of steps carried out by a receiver in said reliable negotiation scenario, according to the present invention.

Referring now to FIGS. 10 and 11, these provide for a detailed implementation for a case where actual XID/PDCP negotiation can be considered to be reliable. In this case, the lower layer (in UMTS case: RRC, Radio Resource Control) takes care of reliability, and thus the layer that uses the C-bit method doesn't need to take care of retransmissions, as in the steps shown in FIGS. 8 and 9. A much simpler procedure is therefore shown in FIGS. 10 and 11. The RRC negotiates the parameters and then informs the PDCP, which then takes care of actions related to the C-bit, as shown in FIGS. 10 and 11. Basically, FIG. 10 is the same as FIG. 8, except for the functions related to the retransmission timer. Similarly, FIG. 11 is similar to FIG. 9, except for the steps related to retransmissions which are not taken care of here, but rather by the lower layer (RRC in UMTS).

Figure 12:
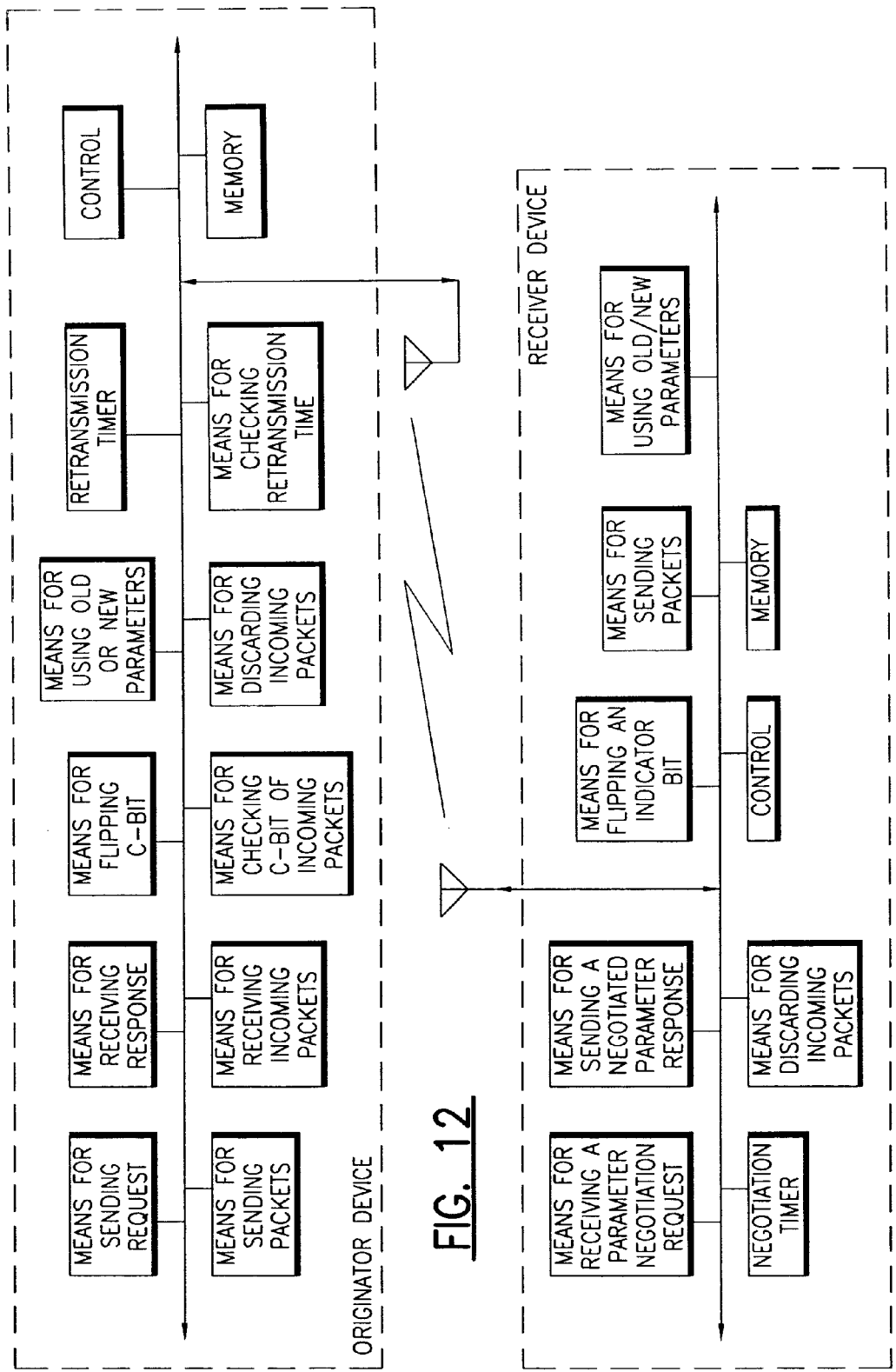
FIG. 12 shows a system including both an originator and a receiver, according to the second aspect of the present invention.

Referring now to FIG. 12, a system is shown for sending and receiving packets between an originator and a receiver in a mobile telecommunications system during negotiation of a parameter for use between the originator and the receiver. The originator includes means for sending a parameter negotiation request from the originator to the receiver, means for flipping a change indicator bit (C-bit) after receiving a negotiation response from the receiver, means for subsequently sending packets to the receiver with the flipped C-bit using new parameters, means for checking the C-bit of packets incoming from the receiver for using the new parameters for packets in which the C-bit has been flipped, and means for discarding incoming packets without the flipped C-bit. Also shown are means for receiving a negotiation response from a receiver, means for using old or new parameters as the case may be, a retransmission timer, a control, means for sending packets, means for receiving incoming packets, means for checking retransmission time, a memory and an antenna.

Similarly, the receiver includes means for receiving a parameter negotiation request from the originator, means for sending a negotiated parameter response with new parameters to the originator, means for flipping an indicator bit, means for sending packets to the originator with the flipped C-bit, means for using old/new parameters for incoming packets from the originator with the C-bit flipped, a negotiation timer, means for discarding incoming packets, a control, a memory and an antenna. The originator and the receiver of FIG. 12 interact with each other, according to the descriptions disclosed above in connection with FIGS. 8 & 9 or 10 & 11. It will be evident to any person of skill in the art how to carry out the above-described methodology on the system of FIG. 12.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method of sending and receiving packets by an originator in a mobile telecommunications system during negotiation of a parameter for use between said originator and a receiver in said mobile telecommunications system, comprising the steps of:

sending a parameter negotiation request from said originator to said receiver, receiving a negotiation response from said receiver, modifying a change indicator, sending future packets to said receiver with said modified change indicator using new parameters, checking the change indicator of packets incoming from said receiver, using said new parameters for packets in which said change indicator has been modified, and using old parameters for said incoming packets without a modified change indicator, wherein the negotiation of a parameter occurs more than a minimum time difference after a previous negotiation.

2. The method of claim 1, wherein while waiting for said negotiation response from said receiver during a timed period, checking for a modified change indicator of packets received from said receiver and discarding any such packets with said modified change indicator while using old parameters for such packets without said modified change indicator.

3. The method of claim 1, further comprising the steps of:

starting a retransmission timer after said step of sending a parameter negotiation request, repeatedly checking said retransmission timer until expiration without receipt of said negotiation response, and in that event, resending said parameter negotiation request from said originator to said receiver.

4. The method of claim 1, wherein the minimum time difference between negotiations is big enough to substantially guarantee that packets in which said change indicator has been modified are not out of sequence.

5. The method of claim 1, wherein the change indicator has two possible values.

6. Method of receiving and sending packets by a receiver in a mobile telecommunications system during negotiation of a parameter for use between said originator and said receiver, comprising the steps of:

receiving a parameter negotiation request from said originator, sending a negotiated parameter response with new parameters to said originator, sending packets to the originator with new parameters and a modified change indicator, and using said new parameters for incoming packets from said originator with said change indicator modified, starting a negotiation timer at the same time as sending said negotiated parameter response with new parameters to said originator, and treating incoming packets without a modified change indicator depending upon whether said negotiation timer has expired, wherein the negotiation of a parameter occurs more than a minimum time difference after a previous negotiation.

7. The method of claim 6, further comprising the steps of:

starting a negotiation timer at the same time as sending said negotiated parameter response with new parameters to said originator, and after said timer expires, discarding incoming packets without a modified change indicator.

8. The method of claim 7, further comprising the step of:

using old parameters for incoming packets without a modified change indicator and said new parameters for incoming packets with said modified change indicator until said negotiation timer expires.

9. The method of claim 6, further comprising the steps of:

starting a negotiation timer at the same time as sending said negotiated parameter response with new parameters to said originator, and after said timer expires, using old parameters for incoming packets without a modified change indicator and said new parameters for incoming packets with said modified change indicator until said negotiation timer expires.

10. Method of sending and receiving packets between an originator and a receiver in a mobile telecommunications system during negotiation of a parameter for use between said originator and said receiver, comprising the steps of:

by said originator:

sending a parameter negotiation request from said originator to said receiver, and after receiving a negotiation response from said receiver, modifying a change indicator, sending future packets to said receiver with said modified change indicator using new parameters, checking the change indicator of packets incoming from said receiver for using said new parameters for packets in which said change indicator has been modified and otherwise discarding said incoming packets;

by said receiver:

receiving a parameter negotiation request from said originator, sending a negotiated parameter response with new parameters to said originator, sending packets to the originator with the modified change indicator and using said new parameters, and using said new parameters for incoming packets from said originator with said change indicator modified, wherein the negotiation of a parameter occurs more than a minimum time difference after a previous negotiation.

11. Apparatus for sending and receiving packets by an originator in a mobile telecommunications system during negotiation of a parameter for use between said originator and a receiver in said mobile telecommunications system comprising:

means for sending a parameter negotiation request from said originator to said receiver with a new parameter specified, means for modifying a change indicator after receiving a negotiation response from said receiver, means for sending subsequent packets to said receiver with said modified change indicator using the new parameter, and means for checking the modified change indicator of incoming packets from said receiver, means for using said new parameters for packets in which said change indicator has been modified, and means for using old parameters for said incoming packets without a modified gong change indicator, wherein the negotiation of a parameter occurs more than a minimum time difference after a previous negotiation.

12. The apparatus of claim 11, further comprising:

means for checking for a modified change indicator in packets received from said receiver while waiting for said negotiation response from said receiver during a timed period, and means for discarding any such packets with said modified change indicator while using old parameters for such packets without said modified change indicator.

13. The apparatus of claim 11, further comprising:

means for starting a retransmission timer after said step of sending a parameter negotiation request, means for checking said retransmission timer until expiration without receipt of said negotiation response, and, means for resending said parameter negotiation request from said originator to said receiver in that event.

14. Apparatus for receiving and sending packets by a receiver in a mobile telecommunications system during negotiation of a parameter for use between said originator and said receiver, comprising:

means for receiving a parameter negotiation request from said originator, means for sending a negotiated parameter response with new parameters to said originator, means for sending packets to the originator with new parameters a modified change indicator, means for using said new parameters for incoming packets from said originator with said modified change indicator, and means for starting a negotiation timer at the same time as sending said negotiated parameter response with new parameters to said originator, and means for treating incoming packets without a modified change indicator depending upon whether said negotiation timer has expired;

wherein the negotiation of a parameter occurs more than a minimum time difference after a previous negotiation.

15. The apparatus of claim 14, further comprising:

means for starting a negotiation timer at the same time as sending said negotiated parameter response with new parameters to said originator, and means for discarding incoming packets without a modified change indicator after said timer expires.

16. The apparatus of claim 15, further comprising means for using old parameters for incoming packets without a modified change indicator and said new parameters for incoming packets with said modified change indicator until said negotiation timer expires.

17. The apparatus of claim 14, further comprising:

means for starting a negotiation timer at the same time as sending said negotiated parameter response with new parameters to said originator, and after said timer expires, means for using old parameters for incoming packets without a modified change indicator and said new parameters for incoming packets with said modified change indicator until said negotiation timer expires.

18. System for sending and receiving packets between an originator and a receiver in a mobile telecommunications system during negotiation of a parameter for use between said originator and said receiver, comprising:

in said originator:
- means for sending a parameter negotiation request from said originator to said receiver,
- means for modifying a change indicator after receiving a negotiation response from said receiver,
- means for sending future packets to said receiver with said modified change indicator using new parameters,
- means for checking the change indicator of packets incoming from said receiver for using said new parameters for packets in which said change indicator has been modified; and, in said receiver:
- means for receiving a parameter negotiation request from said originator,
- means for sending a negotiated parameter response with new parameters to said originator,
- means for sending packets to the originator with modified change indicator and using said new parameters, and
- means for using said new parameters for incoming packets from said originator with said modified change indicator, wherein said originator further comprises means for discarding said incoming packets without said modified change indicator;

wherein the negotiation of a parameter occurs more than a minimum time difference after a previous negotiation.

* * * * *

UNITED STATES PATENT AND TRADEMARK OFFICE
CERTIFICATE OF CORRECTION

PATENT NO. : 6,590,905 B1
DATED : July 8, 2003
INVENTOR(S) : Jan Suumäki et al.

It is certified that error appears in the above-identified patent and that said Letters Patent is hereby corrected as shown below:

Column 10,
Line 49, after "expired" ";" should be -- , --

Column 12,
Line 14, after "indicator" ";" should be -- , --

Signed and Sealed this

Sixteenth Day of September, 2003

JAMES E. ROGAN
*Director of the United States Patent and Trademark Office*